W. F. DOLL.
RESILIENT WHEEL.
APPLICATION FILED DEC. 27, 1912.
1,091,303.
Patented Mar. 24, 1914.
2 SHEETS—SHEET 2.
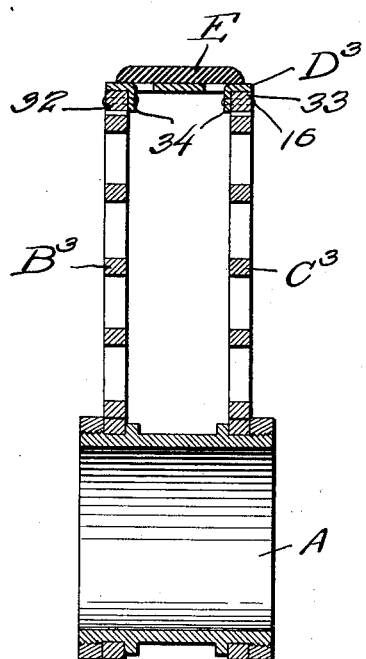
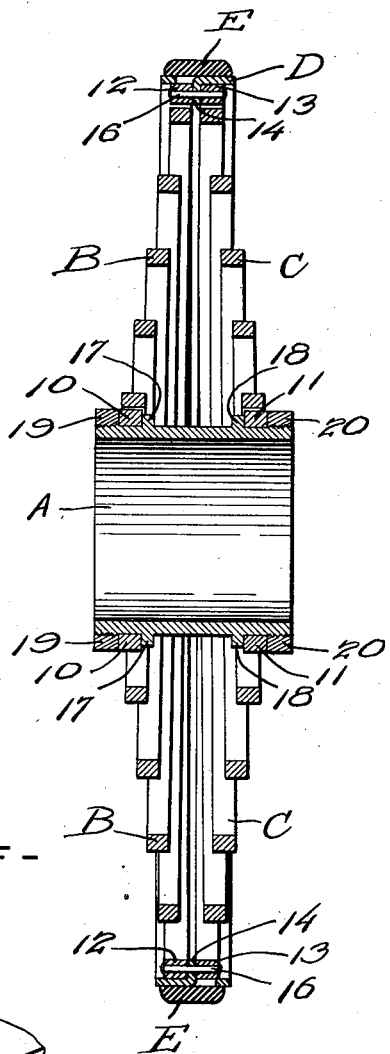
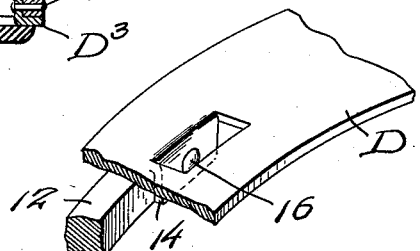
Inventor
William F. Doll
By C. J. Stockman
Attorney
Witnesses

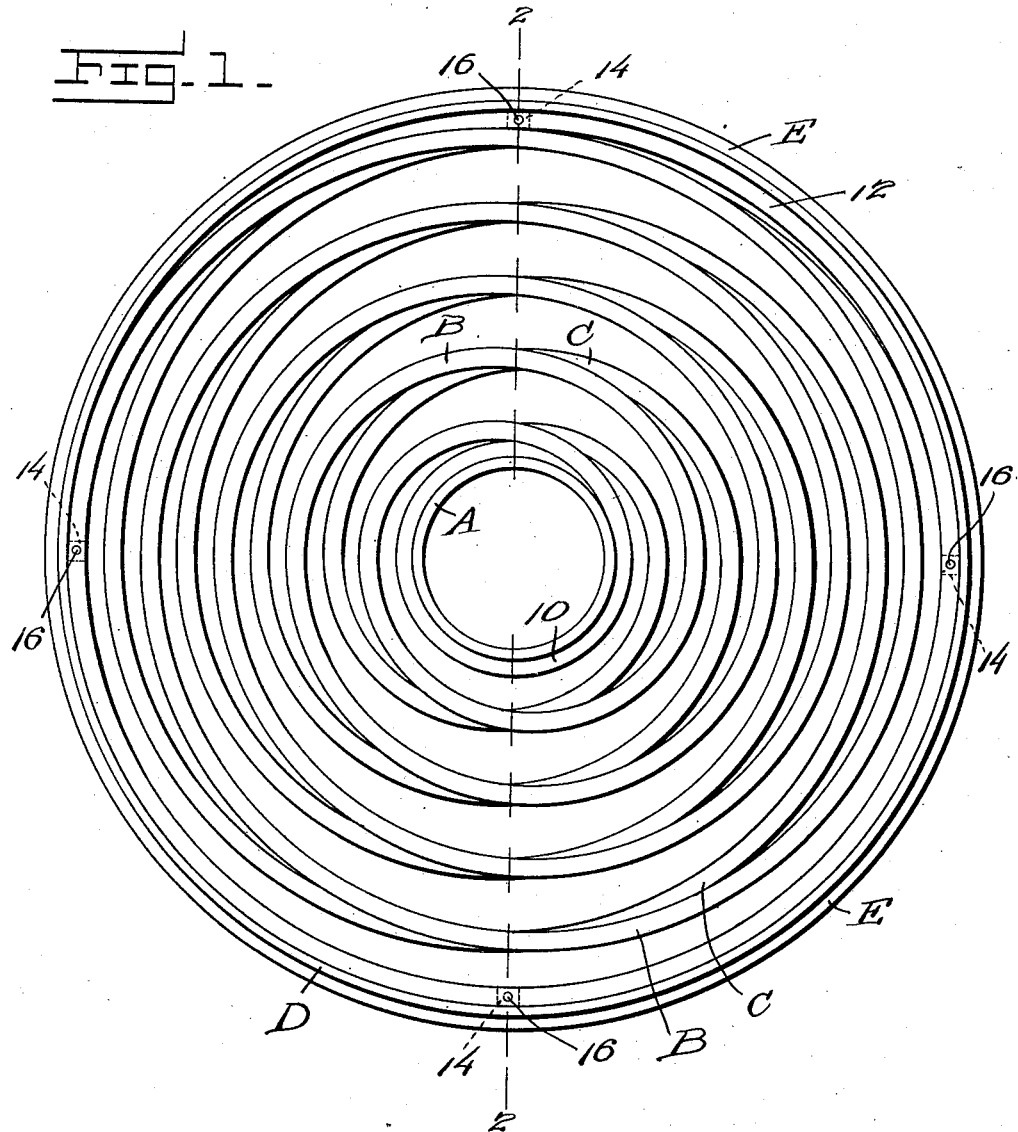

UNITED STATES PATENT OFFICE.

WILLIAM F. DOLL, OF NEW YORK, N. Y., ASSIGNOR OF ONE-HALF TO LEE McCLUNG, OF WASHINGTON, DISTRICT OF COLUMBIA.

RESILIENT WHEEL.

1,091,303.            Specification of Letters Patent.     Patented Mar. 24, 1914.

Application filed December 27, 1912. Serial No. 738,859.

*To all whom it may concern:*

Be it known that I, WILLIAM F. DOLL, a citizen of the United States, residing in Manhattan borough, in the city and county of New York and State of New York, have invented new and useful Improvements in Resilient Wheels, of which the following is a specification.

This invention relates to resilient wheels or the like, including, for example, automobile wheels, truck wheels, motorcycle wheels, bicycle wheels, carriage wheels, wagon wheels, gear wheels, pulleys, etc., hereinafter generically referred to as wheels.

It particularly relates to a resilient wheel or the like whose body or spoke-portion comprises oppositely disposed spirals, the convolutions of which preferably extend from the hub to the rim of the wheel and around in the form of a circle at the rim.

One of the most important purposes of the present invention is to improve the construction of wheels or the like shown in my co-pending application No. 671,846 which has since become Patent No. 1,048,813, issued December 31st, 1913, the improvements having particular reference to features of construction whereby the wheel may be more easily manufactured. This purpose, and others not necessary herein particularly to set forth, are subserved by the constructions which are illustrated in the accompanying drawings and exemplify different practical embodiments of the present invention. It should be understood at the outset, however, that the invention is not restricted to these particular constructions but may be otherwise and variously embodied without departing from its spirit or the scope of the subjoined claims.

In the accompanying drawings, wherein like characters of reference denote corresponding parts:—Figure 1 is an elevation of a wheel constructed in accordance with the present invention; Fig. 2 is a vertical sectional view on the line 2—2 of Fig. 1; Fig. 3 is a vertical sectional view on a line corresponding to the line 2—2 of Fig. 1, illustrating a slightly changed embodiment of the invention; and Fig. 4 is a detail perspective view illustrating the preferred means for attaching one of the spring members to the encircling band or rim of the wheel.

A designates a hollow sleeve which may desirably form the hub or corresponding portion of a wheel in which the present invention is embodied: the body or spoke portion of said wheel comprising two oppositely disposed spirally-coiled members B and C whose innermost convolutions 10 and 11 embrace the sleeve A and whose outermost convolutions 12 and 13 are fixedly connected with each other. As is clearly shown in Fig. 1, the convolutions of the coils of the members B and C extend in relatively reverse directions from the member A, that is to say, the member B is coiled from the sleeve A in a direction the reverse of that in which the coils of the member C extend from said sleeve. The outer convolutions 12 and 13 of the coils extend around in circular form and are encircled by a band D. In the herein exemplified forms of the invention the band D has an outer surface which is flat in cross section: but it will be understood that this is merely exemplary and that the style of the rim may vary according to the particular use to which the wheel is to be put, and also according to the particular kind or style of tire which is employed. The tire E shown in the accompanying drawings exemplifies one style of tire which may be employed, but it will be understood that any style of tire may be used and also that in some instances, for instance, pulleys and gear wheels, tires will be dispensed with.

In the construction shown in Fig. 2, the band is formed with a series of inwardly extending spaced lugs 14 which are arranged between the confronting side surfaces of the outermost convolutions 12 and 13 of the members B and C. Said convolutions are fixedly secured to each other, in this exemplified form of the invention, by means of rivets or bolts 16 which extend through them and through the lugs 14. It will be noted that in the construction shown in Fig. 2, the members B and C are inclined toward each other from the member A to the band D, whereby the wheel is not only resilient in both vertical and horizontal planes, but has the cup-shape which is highly desirable in a wheel of this kind. The inner convolutions 10 and 11, of the members B and C, are held in a spaced relation by lugs 17 and 18 or other suitable means which are formed or mounted on the member A and suitable means are provided for preventing outward displacement of said coils from the member A, the means herein shown for the latter purpose consisting of nuts 19 and 20 threaded on the outer ends of the sleeve A.

In the form shown in Fig. 2 the outermost convolutions of the members B and C are arranged close together, but where a wide tread or rim is required it is preferred to space said outermost convolutions from each other. An example of such an embodiment is shown in Fig. 3 wherein the band, designated D³, is formed with spaced lugs 34 and the spirally coiled members designated B³ and C³ have their outer convolutions 32 and 33 respectively secured to said lugs. In the construction shown in Fig. 3, the members B and C are disposed in parallel planes, but it is apparent that they may converge from the hub toward their outermost convolutions if desired.

It will be observed that the lugs which project inwardly from the bands D or D³ hold the outer convolutions of the members B and C or B³ and C³ against inward displacement as well as serving as elements of means for securing the outer convolutions to the band. These lugs in the herein exemplified form of the invention are struck up from the metal of the bands. This is preferred but other means than such lugs may be employed without departing from the spirit of the invention as defined by the subjoined claims. In fact, it is not essential to the invention, considered in its broadest aspects, that the rim and the spirally-coiled members be rigidly secured to each other by fastening elements, if they be so connected as to move unitarily and be restrained against accidental disconnection. It is considered to be highly advantageous to employ a rim having an inwardly projecting means extending between the outer convolutions of the spirally-coiled members and to secure said outer convolutions to said means, and this particular embodiment, therefore, has been herein claimed.

It will be observed that the wheel herein exemplified is resilient in all directions, is strong and durable and is so constructed that its parts may be economically produced and readily, easily and quickly assembled. Further, it will be observed that either of the spirally-coiled members may be removed and replaced, in the event of breakage, for example, without necessitating replacement of the other. In order to assemble the parts it is only necessary to slip the spirally-coiled members over the ends of the sleeve A and into the band D until their inner convolutions bear against the outer surfaces of the outwardly projecting elements extending from said sleeve, and their outer convolutions bear against the inwardly projecting means extending from the band: then fasten said outermost convolutions to the projection or projections of the band and then apply the clamping nuts 16.

Obviously, the sleeve A may be mounted directly upon the shaft or axle (not shown) so as to constitute a bearing sleeve for the wheel or the like; or if desired, it may contain any suitable construction or arrangement of springs interposed between the shaft or axle and its inner wall, for giving additional resilience to the wheel. As such springs are not essential to the present invention and do not form any part of the present invention, they are not herein illustrated.

Having now described the invention what I believe to be new and desire to secure by Letters Patent, is:—

1. A resilient wheel or the like, having its body composed of a plurality of separate reversely-coiled spiral springs the convolutions of which extend to the circumference of the body and thence around in circular form, a separate rim encircling the circumferential convolutions of said springs and having means at intervals engaged with the sides of the circumferential convolutions of the springs and secured thereto.

2. A resilient wheel or the like having its body provided with separately-formed oppositely-disposed spirally-coiled springs which converge from their axial portions to their circumferential convolutions, a rim encircling the circumferential convolutions of the springs and having means projecting inwardly beyond its inner surface, the circumferential convolutions of the springs being arranged adjacent to the opposite sides of said inwardly-projecting means, and means for laterally securing thereto the circumferential convolutions of both springs.

3. A resilient wheel or the like having its body provided with separately-formed oppositely-disposed spirally-coiled springs, a rim encircling the circumferential convolutions of the springs, said rim being provided with inwardly projecting lugs arranged adjacent to the circumferential convolutions of the springs and means for securing said convolutions to said lugs.

4. A resilient wheel or the like having its body provided with separately-formed oppositely-disposed spirally-coiled springs, a rim encircling the circumferential convolutions of the springs, said rim being provided at intervals with inwardly-projecting lugs which are arranged adjacent to the circumferential convolutions of the springs and are struck out of the body of the rim, and means for securing said convolutions of the springs to said lugs.

5. A resilient wheel or the like comprising a pair of separately-formed oppositely-disposed, spirally-coiled springs, an inner member arranged in the axis of said springs and provided with outward projections which are spaced from each other, removable holding elements which are mounted on the inner member and coöperate with the projections of the latter to maintain the inner convolutions of the springs in a spaced relation on the inner member, a rim encircling the circumferential convolutions of the springs and having inwardly-extending lugs arranged at intervals around the same and means for securing said lugs to the outer convolutions of the springs.

6. A resilient wheel or the like having its body composed of a plurality of separate reversely-coiled spiral springs which converge from their axial convolutions to their circumferential convolutions, an inner member encircled by the axial convolutions of the coiled springs and provided with means for maintaining said convolutions in a spaced relation, a rim encircling the circumferential convolutions of said springs and formed at intervals with inwardly-projecting lugs, which are arranged between and adjacent to the confronting surfaces of said convolutions, and means for securing the circumferential convolutions of the springs to said lugs.

In testimony whereof I have hereunto set my hand in presence of two subscribing witnesses.

WILLIAM F. DOLL.

Witnesses:
 JOHN J. RARAGAN,
 ISABEL R. RICHARDS.

---

Copies of this patent may be obtained for five cents each, by addressing the "Commissioner of Patents, Washington, D. C."